United States Patent [19]

Romagnoli

[11] 4,433,798

[45] Feb. 28, 1984

[54] VOLUMETRIC DOSING APPARATUS FOR PARTICULATE MATTER

[75] Inventor: Andrea Romagnoli, San Lazzaro di Savena, Italy

[73] Assignee: Industria Macchine Automatiche, Bologna, Italy

[21] Appl. No.: 341,170

[22] Filed: Jan. 21, 1982

[30] Foreign Application Priority Data

Jan. 23, 1981 [IT] Italy .................................. 3314 A/81

[51] Int. Cl.³ .............................................. B67D 5/52
[52] U.S. Cl. ...................................... 222/255; 222/360
[58] Field of Search ............... 222/252, 251, 265, 255, 222/309, 359, 360, 367, 271, 372, 376, 383, 385, 410; 53/134

[56] References Cited

U.S. PATENT DOCUMENTS

2,878,970  3/1959  Dobkin ............................... 222/360
3,737,073  6/1973  Lapert ................................ 222/309

FOREIGN PATENT DOCUMENTS

721347  7/1965  Italy .

*Primary Examiner*—Joseph J. Rolla
*Assistant Examiner*—Kenneth Noland
*Attorney, Agent, or Firm*—Karl F. Ross

[57] ABSTRACT

An apparatus for volumetrically dosing particulate matter, such as tea to be loaded into bags, comprises a housing whose lower part is kept filled through a hopper with the mass of particles above the top of a dosing drum which is intermittently rotatable just above the housing bottom about a generally vertical axis and has several outwardly open, angularly equispaced throughgoing peripheral notches of constant horizontal cross-section. A discharge compartment of the housing accommodates a segment of the drum, including two of its notches, and has an entrance gate closely hugging the drum surfaces so that only the particles occupying a notch can reach that compartment. A first plunger then enters an incoming notch from above and expels a predetermined fraction of its contents into an underlying trough from which the resulting overflow is recirculated by a screw conveyor to the interior of the housing outside the metering compartment; after a partial rotation of the drum, a second plunger enters the same notch from above and ejects its remaining contents into a discharge spout aligned therewith.

8 Claims, 4 Drawing Figures

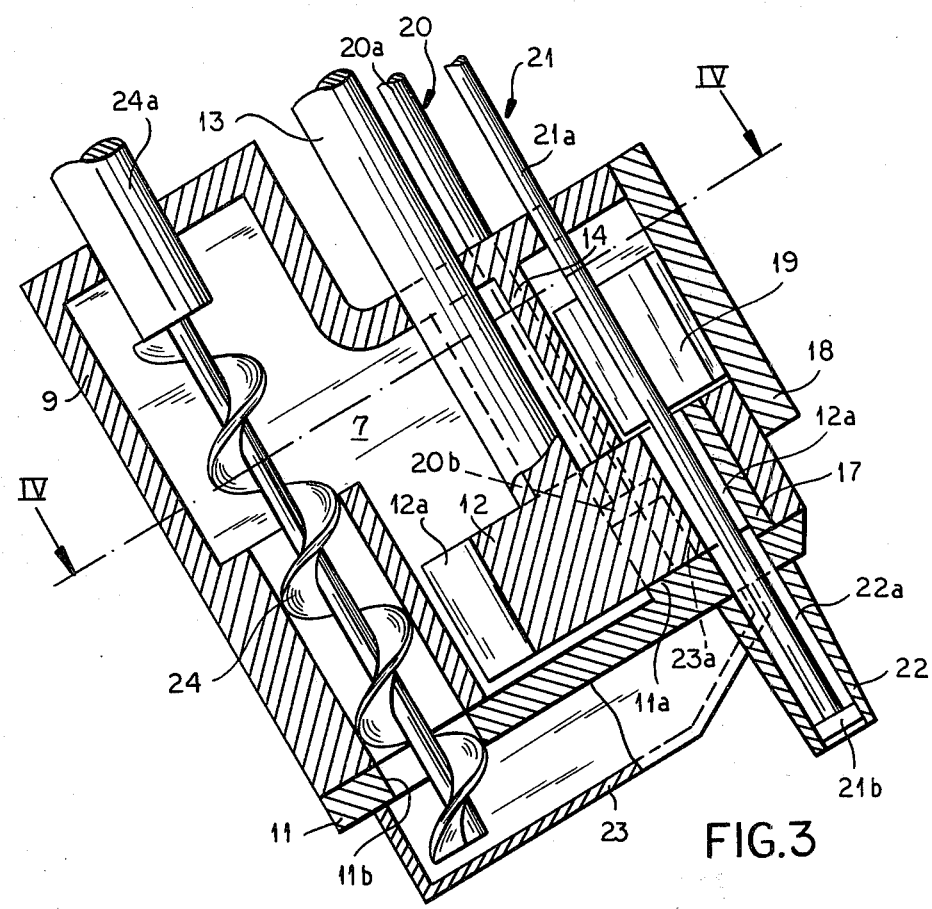
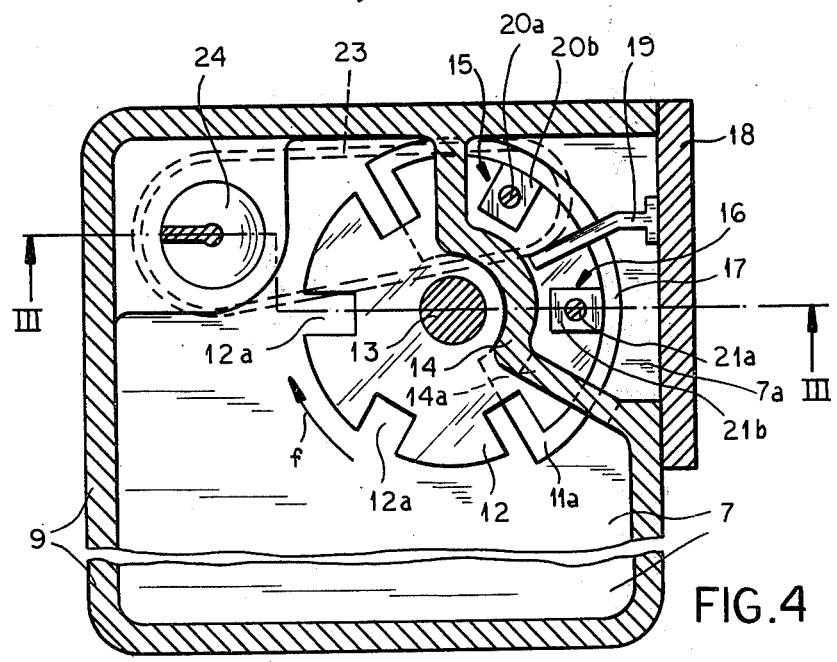

VOLUMETRIC DOSING APPARATUS FOR PARTICULATE MATTER

FIELD OF THE INVENTION

My present invention relates to an apparatus for the volumetric dosing of particulate matter, such as tea or herbs to be loaded into permeable bags of filter paper to form infusion packages.

BACKGROUND OF THE INVENTION

A machine for making such infusion packages, with tags attached to the filter bags, is described in my U.S. Pat. No. 4,288,224. Reference may also be made to commonly owned Italian patent No. 721,347 and my copending U.S. patent application Ser. No. 227,767 now U.S. Pat. No. 4,382,355.

A dosimeter of the type described in the commonly owned Italian patent comprises an intermittently rotatable dosing drum with angularly equispaced metering chambers in the form of axially extending bores which, upon immersion of the drum in the comminuted mass, are filled up with particles of that mass. The bottom of the housing containing the drum has two holes above which each bore successively comes to rest. A metering plunger in line with the first hole enters an overlying bore from below and rises to a predetermined level within that bore to expel part of its contents into the mass overlying the drum at that point. When the partly emptied bore is stepped into alignment with the second hole, the expelled excess is swept off the upper drum surface whereupon a dispensing plunger enters the bore through that second hole and discharges its remaining contents into an outlet.

Such a dosimeter operates generally satisfactorily but has been found incapable of substantially exceeding a rate of about two dosings per second. Since a packaging machine for the filling and labeling of tea bags—as disclosed in my above-identified prior patent—can produce up to 500 bags per minute, the relatively slow mode of operation of an associated dosing apparatus represents a serious drawback.

OBJECT OF THE INVENTION

The object of my present invention, therefore, is to provide an improved dosing apparatus capable of dispensing particulate matter (e.g. tea) at an increased rate.

SUMMARY OF THE INVENTION

I have found that the chief impediments to the attainment of higher operating speeds in the aforedescribed dosimetric apparatus are the restricted penetrability of the bore-shaped metering chambers by the surrounding particulate matter and the resistance encountered by the metering plunger as it rises to expel some of the contents of such a chamber into the overlying mass. These drawbacks are obviated, in accordance with my present improvement, by designing the metering chambers as peripheral notches or grooves of the dosing drum, these notches being open to the upper and lower faces and to the periphery of the drum so that the surrounding particles can enter them from three sides, and by disposing the two plungers above rather than below the drum whereby the metering plunger is able to expel the excess contents of a chamber into an underlying overflow outlet rather than into the particle-filled interior of the drum housing. The notches, of course, must have a constant cross-section—transverse to the generally vertical drum axis—conforming to the outline of the plungers. In order to prevent any expulsion of particles through the open side of a notch, the housing is divided by an internal partition into a supply compartment communicating with a hopper and a discharge compartment accommodating a sectoral portion of the drum which encompasses two of its notches, the latter compartment having an arcuate wall in contact with the periphery of that sectoral portion. The metering and dispensing plungers are respectively aligned with a notch in a first and a second position of the discharge compartment; these positions may be separated by a generally vertical baffle closely adjoining the upper drum face for sweeping stray particles from that face into a notch passing from the first to the second position.

In order to keep the discharge compartment as clear as possible from particles other than those entrained by the incoming notches or grooves, I prefer to separate the supply and discharge compartments by an entrance gate bounded by edges which are in close contact with the periphery and the upper and lower faces of the drum. The gate may be formed in its entirety by an aperture in the partition, yet in the embodiment described hereinafter its lower boundary is constituted by an edge of a platform which rises from the bottom of the housing and on which the drum is supported near that bottom.

Pursuant to another advantageous feature of my invention, the overflow outlet receiving excess particles expelled by the metering plunger opens into a receptacle which communicates with the supply compartment of the housing by conveyor means—preferably a feed screw—serving for the return of these excess particles to the mass surrounding the drum. The receptacle preferably slopes down from the overflow outlet to the conveyor means.

BRIEF DESCRIPTION OF THE DRAWING

The above and other features of my invention will now be described in detail with reference to the accompanying drawing in which:

FIG. 3 is a vertical cross-sectional view, taken on the line III—III of FIG. 4 and drawn to a still larger scale, of a housing containing a dosing drum and a screw conveyor forming part of the apparatus of FIG. 2; and FIG. 4 is a cross-sectional view taken on the line IV—IV of FIG. 3.

SPECIFIC DESCRIPTION

Figure 1:
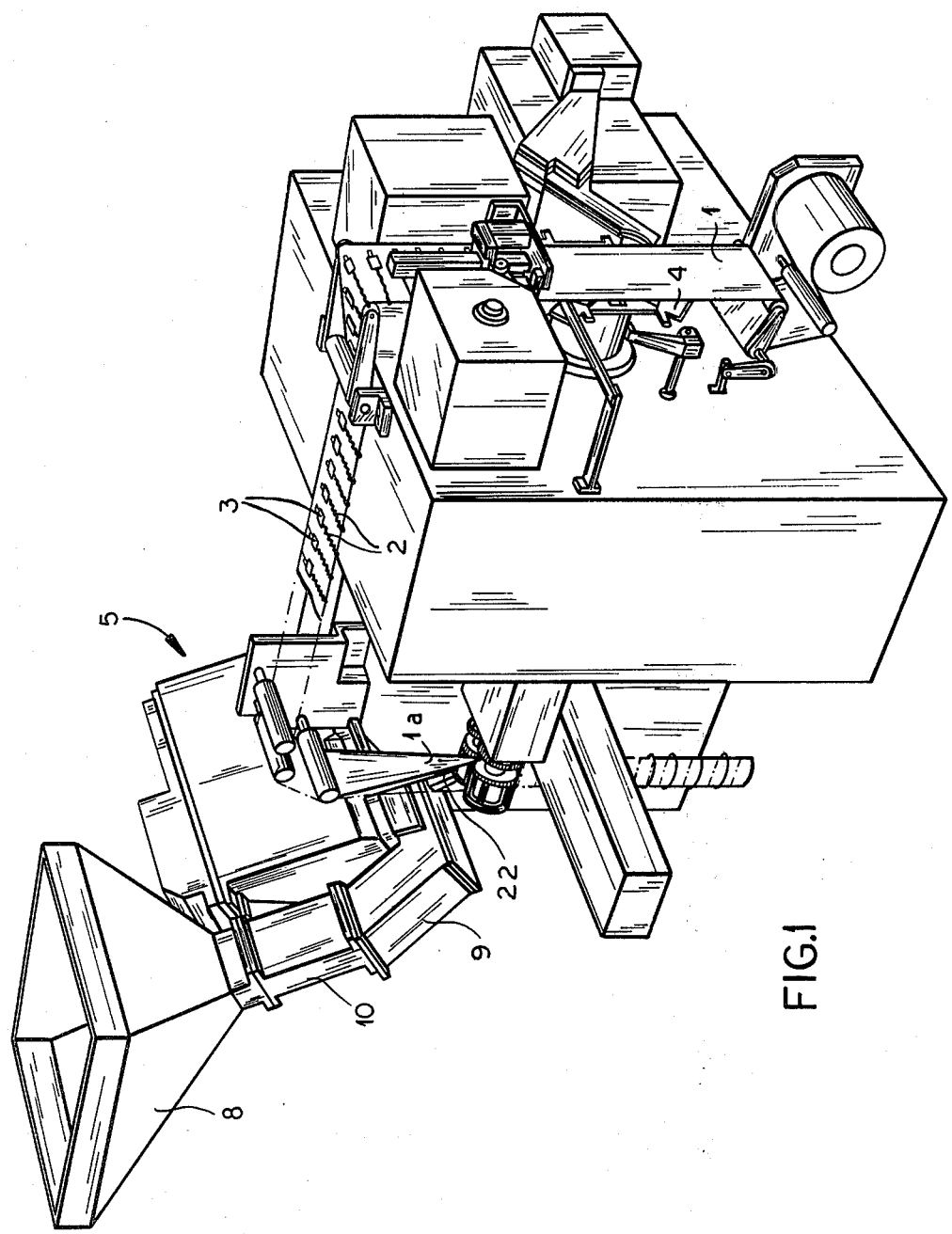
FIG. 1 is a perspective view of a packaging machine equipped with a volumetric dosing apparatus embodying my invention.

In FIG. 1 I have shown a packaging machine for making tea bags, of the type referred to above, in which a web 1 of filter paper passes in front of a wheel 4 with four radial arms as described in my aforementioned prior Pat. No. 4,288,224. Sections of thread 2 with tags 3 are looped at uniform intervals about the web 1 which has a thin film of adhesive thermoplastic material applied to one of its surfaces. The loop is then cut just beyond tag 3, leaving part of its thread attached to the adhesively coated web surface. The web is then folded longitudinally, as indicated at 1a, and is sealed transversely between successive threads as well as longitudinally along the open side. Just prior to the sealing operation, a measured quantity of tea is laterally introduced between the folds of the web by a nozzle or spout 22 of a dosing apparatus 5 more fully described hereinafter, the tea being supplied to that apparatus through a hopper 8. There are thus formed a series of coherent tea bags which are subsequently severed from one another along centerlines of their transverse seals.

Figure 2:
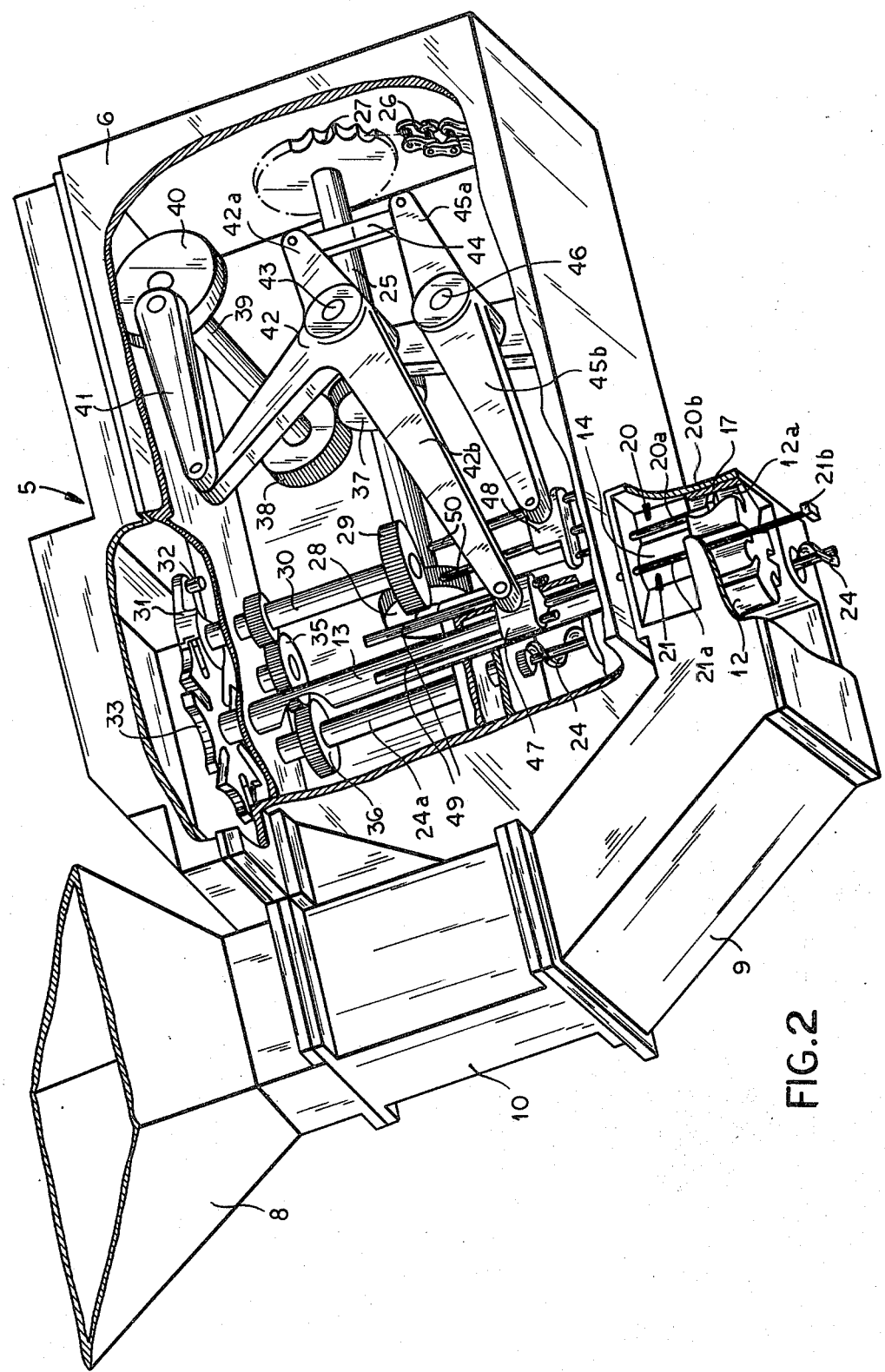
FIG. 2 is a perspective view of the dosing apparatus, drawn to a larger scale and with parts broken away.

As shown in FIG. 2, the dosing apparatus 5 comprises a casing 6, with major sides tilted to the vertical at less than 45°, overlying a part of a generally elbow-shaped housing 9 which communicates through a duct 10 with hopper 8. FIGS. 3 and 4 show the interior of housing 9 divided by a partition 14 into a supply compartment 7 and a discharge compartment 7a. A generally vertical shaft 13, entering the housing 9 from casing 6 (FIG. 2), is rigid with a helical dosing drum 12 which is rotatable about the axis of that shaft and rests in part on a raised semicircular platform 11a of a bottom plate 11. Drum 12 is formed with several axially extending notches or grooves 12a, of constant rectangular transverse cross-section, which are peripherally spaced with a constant pitch (here of 60°) and are open at the top, the bottom and the circumference of the drum. A minor part of that circumference, extending over about 120° so as to encompass two notches 12a, lies within discharge compartment 7a; rotating clockwise, as indicated by an arrow f in FIG. 4, the drum enters the compartment 7a through a narrow gate bounded at the top and at its radially inner side by partition 14, at the bottom by an edge of platform 11a and at its radially outer side by an arcuate wall portion 17 which is centered on the drum axis and extends over about 150°, thus projecting into supply compartment 7. This wall portion, whose inner radius equals the outer radius of drum 12, has the same height as the drum which is closely hugged thereby so that the sides of notches 12a are closed during their passage through compartment 7a. The latter compartment is closed toward the outside by a swingable or detachable lid 18 which carries a generally vertical baffle 19 ending just above the upper face of the drum; that baffle subdivides the compartment 7a into two substantially equal sections below which the bottom plate 11 is provided with two rectangular apertures 22a, 23a (FIG. 3) conforming to and aligned with respective notches 12a when the intermittently rotating drum comes to rest in the position shown in FIG. 4. Aperture 22a extends into the nozzle or spout 22, which is integral with bottom plate 11, whereas aperture 23a opens into an overflow receptacle 23 secured to the underside of plate 11. Another aperture 11b in plate 11 is traversed by a generally vertical feed screw 24 integral with a shaft 24a which extends from casing 6 of FIG. 2 into the lowest part of receptacle 23.

A metering plunger 20 and a dispensing plunger 21 also extend generally vertically from casing 6 into housing 9, these plungers having respective stems 20a, 21a terminating in heads 20b, 21b which fit closely into the notches 12a and respectively overlie the bottom apertures 23a and 22a. The two plungers, which are upwardly withdrawn from drum 12 when the latter is stepped by one pitch, are reciprocable parallel to the drum axis with synchronous motions but with different stroke lengths; thus, head 20b descends only partly into a notch overlying aperture 23a whereas head 21b moves all the way through an overlying notch to the end of nozzle aperture 22a.

FIG. 2 shows a driving mechanism for continuously rotating the feed screw 24, stepping the drum 12 and reciprocating the plungers 20 and 21 in a mutually correlated manner. This mechanism comprises a horizontal main shaft 25 to which a sprocket 27, driven by a nonillustrated motor via a chain 26, is keyed along with two helical gears 28 and 37. Gear 28 meshes with another helical gear 29 on a generally vertical shaft 30. The latter carries a driving wheel 31 of a Geneva movement whose driven wheel 33, with six radial slots periodically engaged by a stud 32 on wheel 31, is rigid with drum shaft 13. A spur gear 34 keyed to shaft 30 meshes through a reversing gear 35 with a spur gear 36 keyed to screw shaft 24a.

Gear 37 meshes with another helical gear 38 on a horizontal shaft 39 to which an eccentric 40 is keyed. A pitman 41 articulated to eccentric 40 is pivoted to an arm 42 which is swingable about a horizontal fulcrum 43 and has two further arms 42a, 42b; arm 42a is connected via a link 44 with an arm 45a of another lever, swingable about a horizontal fulcrum 46, having a second arm 45b shorter than arm 42b. The two lever arms 42b and 45b are respectively articulated (with a certain amount of lateral play) to a pair of sliders 47, 48 which are guided parallel to shafts 13, 24a and 30 by respective pairs of fixed rods 49, 50 and carry the stems 21a, 20a of plungers 21 and 20.

In operation, housing 9 is filled via hopper 8 and duct 10 with tea to a level well above the upper face of drum 12. The notches 12a lying within supply compartment 7 are completely filled with particles of the surrounding mass of tea and entrain these particles into discharge compartment 7a as the drum rotates intermittently in steps of 60°. An incoming notch, when arriving in a first position 15 within compartment 7a, is entered by the head 20b of plunger 20 which descends to a level indicated in FIGS. 2 and 3 whereby part of the contents of that notch is expelled into overflow receptacle 23 through aperture 23a. On the next step, after plunger head 20b has been withdrawn above the upper drum face, the notch passes underneath baffle 19 which tends to sweep into that notch any loose particles that may have been drawn out of it by the rapidly ascending plunger head. When the drum again comes to rest, the notch then finds itself in a second position 16 overlying the aperture 22a of nozzle 22; at that instant the plunger 21 comes down, its head 21b ejecting all the remaining tea particles into the folded web 1a (FIG. 1) just before that web descends into the underlying sealing station. After the withdrawal of plunger head 21b from the notch thus emptied, the latter passes into supply compartment 7 underneath partition 14 whose lower edge at this point may be somewhat elevated at 14a above the upper drum face to let any particles still adhering to that face re-enter the mass in compartment 7.

Since wall portion 17 is flush with the upper face of drum 12, stray particles not swept by baffle 19 into an advancing notch will fall into an outer portion of compartment 7a near the corner thereof from which they can be cleared upon removal of lid 18. It is, of course, also possible to provide a connection between this outer portion of compartment 7a and the overflow receptacle 23. Thanks to the sloping bottom of that receptacle in the vicinity of overflow outlet 23a, as well as to the overall tilt of housing 9 clearly shown in FIGS. 1-3, the excess expelled by plunger 20 will gravitate toward the bottom end of feed screw 24 so that there will be little if any accumulation resisting the motion of that plunger.

The mechanism of FIGS. 2-4 is capable of dispensing tea or other particulate matter at a rate of about 500 doses per minute, thus matching the speed of the packaging machine in FIG. 1.

I claim:

1. An apparatus for volumetrically dosing particulate matter, comprising:

a housing divided by an internal partition into a supply compartment and a discharge compartment;

hopper means communicating with said supply compartment for keeping same partly filled with a mass of particles to be dispensed;

a dosing drum disposed in said housing near the bottom thereof and rotatable about a generally vertical axis, said dosing drum having a plurality of angularly equispaced peripheral notches of constant transverse cross section which are open to upper and lower faces and to the circumference of said drum so as to be entirely occupied by particles of a surrounding mass, said drum lying partly in said supply compartment and extending into said discharge compartment with a sectoral portion encompassing two of said notches, said discharge compartment having an arcuate wall in contact with the periphery of said sectoral portion;

drive means coupled with said drum for intermittently rotating same in steps equaling the pitch of said notches, thereby successively arresting an incoming notch in a first and in a second position in said discharge compartment, said housing being provided with an overflow outlet and with a dosing outlet respectively underlying a notch of said drum in said first and said second position thereof;

a first plunger reciprocable parallel to said axis in said discharge compartment above said overflow outlet and coupled with said drive means for entering a notch in said first position from above and descending therein to a predetermined level with resulting expulsion of a certain fraction of the contents of the notch into said overflow outlet; and a second plunger reciprocable parallel to said axis in said discharge compartment above said dosing outlet and coupled with said drive means for entering a notch in said second position from above and passing completely therethrough to eject the remaining contents of the notch into said dosing outlet.

2. An apparatus as defined in claim 1 wherein said compartments are separated from each other by an entrance gate formed at least in part by said partition and bounded by edges in close contact with the periphery and with the upper and lower faces of said drum for preventing particles other than those lodged in an incoming notch from being entrained into said discharge compartment.

3. An apparatus as defined in claim 2 wherein said first and second positions are separated by a generally vertical baffle in said discharge compartment closely adjoining the upper face of said drum for sweeping stray particles from said upper face into a notch passing from said first position to said second position.

4. An apparatus as defined in claim 1, 2 or 3 wherein said housing is provided with a receptacle communicating with said overflow outlet for receiving excess particles expelled by said first plunger, further comprising conveyor means extending from said receptacle to said supply compartment for returning excess particles to the latter.

5. An apparatus as defined in claim 4 wherein said conveyor means comprises a feed screw with a generally vertical axis coupled with said drive means for continuous rotation.

6. An apparatus as defined in claim 5 wherein said drive means comprises a continuously rotating shaft coupled with said drum via a Geneva movement, with said plungers via a crank drive and with said feed screw via a gear train.

7. An apparatus as defined in claim 4 wherein said receptacle slopes down from said overflow outlet to said conveyor means.

8. An apparatus as defined in claim 2 or 3 wherein said bottom has a raised platform underlying said sectoral portion, said gate being bounded in part by an edge of said platform.

* * * * *